Oct. 10, 1961     P. J. VAUGHAN     3,003,903
STRETCHED LAMINATED FILM
Filed Nov. 13, 1958

INVENTOR.
PAUL J. VAUGHAN
BY
*R. L. Miller*
ATTORNEY

United States Patent Office 3,003,903
Patented Oct. 10, 1961

3,003,903
STRETCHED LAMINATED FILM
Paul J. Vaughan, Cuyahoga Falls, Ohio, assignor to The Goodyear Tire & Rubber Company, Akron, Ohio, a corporation of Ohio
Filed Nov. 13, 1958, Ser. No. 773,708
2 Claims. (Cl. 154—50)

This invention relates to a three-ply oriented film which has surface plies of rubber hydrochloride film and an intermediate ply of a polyvinyl plastic film.

Rubber hydrochloride film is a well-known film, useful for wrapping foods and for other purposes. It has good resistance to moisture, grease and aliphatic hydrocarbons generally. It has particularly good heat-sealing properties. Certain problems have been encountered in making and using oriented rubber hydrochloride film. For example, the oriented film is heat-shrinkable, and even without heating there is a tendency for the freshly made film to shrink, when in storage. Also, it tends to shrink as it is being wound up into a roll causing bagginess and wrinkles in the film making it difficult to produce a finished roll of flat profiile. Another objection to oriented rubber hydrochloride film is that it is not sufficiently stiff to be used on some commercial automatic packaging machines.

The three-ply oriented film of the present invention is free from at least some of the objections to the single-ply oriented film. For instance, the intermediate ply prevents the surface plies of the laminated product from shrinking immediately after stretching. However, the laminated product can be shrunken about a package or the like by heating to a temperature of 180° F., more or less, depending upon the temperature at which the film was stretched. At lower temperatures the laminated film is dimensionally stable.

Because rubber hydrochloride film constitutes the surface plies, the laminated product is resistant to the many solvents, etc. to which rubber hydrochloride is resistant. Also it is heat sealable in the relatively broad temperature range in which rubber hydrochloride is heat sealable, and the bond formed by heat sealing two plies of the laminated product together is as strong as the bond between two heat-sealed rubber hydrochloride films, and that is notoriously strong.

The rubber hydrochloride film used in the laminated product may be plasticized or unplasticized. Plasticized surface plies produce a slightly softer laminated product than when unplasticized film is employed. The laminated product made with plasticized surface plies has greater tensile strength, and when heated it shrinks more strongly than the laminated product produced from plasticized surface plies.

Laminated products in which the two surface films are of the same thickness and plasticizer content are more balanced than laminated products in which the surface films are not the same. Both surfaces of such balanced film react the same when the film is heated to cause it to shrink, whereas if the surface plies are not the same, the laminate tends to curl toward the surface at which the surface film is the thinnest or contains the least plasticizer.

The plasticizers usable in the rubber hyrochloride plies are those usually employed in such film, namely, esters, such as, for example, dibutyl sebacate, dioctyl phenyl phosphate, and the many others described in the patent literature and elsewhere. If plasticizer is present in the surface plies, ordinarily in the range of 5 or 10 percent is employed, although 15 percent may be used. Plasticized surface films heat seal at a progressively lower temperature than unplasticized films. Likewise the laminate with plasticized surface films as compared to that with unplasticized surface films stretches more readily and the preferred stretching temperature is somewhat lower. The laminate with unplasticized film can be stretched to about four times its unstretched area, up to twelve or more times its unstretched area, whether stretched in one or both directions; and the laminate with plasticized film can be stretched to a greater area, up to sixteen or more times its original area. The rubber hydrochloride film is usually cast from solution.

The intermediate ply is preferably composed of polyvinyl chloride, although it may be composed of a copolymer of vinyl chloride with up to 15 percent of ethylenically unsaturated monomer such as vinyl acetate, vinylidene chloride, styrene, an alkyl or dialkyl fumarate or maleate or chloromaleate or chlorofumarate, an alkyl acrylate or alpha-substituted acrylate, vinyl cyanide, or any one or more of the many other such monomers disclosed in the patent literature and elsewhere. The film may be extruded, calendered or cast from solution in an organic solvent. If extruded, the homopolymer must be plasticized; certain copolymers may be extruded without being plasticized. The homopolymer of vinyl chloride and different copolymers when used as the central ply give laminates of different softness, and plasticizer may be used with like effect.

Although the three-ply laminate will ordinarily be biaxially oriented, it may be oriented in but one direction. Film oriented in only one direction is desirable for a cylindrical wrap or the like which is to be shrunk on to an object by heating. The biaxially oriented film will be described more particularly. Such film can be stretched to a greater extent in one direction than in the other direction. In usual practice, it will be stretched in each direction to at least twice its unstretched dimension.

The biaxially oriented film is preferably first stretched longitudinally, and then laterally, although the order of stretching may be reversed or the film may be stretched in both directions simultaneously. The plies are laminated together before the second stretching, and preferably before the first stretching.

The oriented product is not sufficiently flexible for wrapping if it is substantially over 0.002 inch thick and for most packaging operations a film less than 0.001 inch thick is required. Presently, films about 0.0004 inch thick are in great demand. Before orienting or laminating, the individual surface and intermediate plies are from 0.0005 to 0.004 inch thick.

The following example is illustrative:

The surface plies are cast films of rubber hydrochloride of the following analysis:

| | Parts |
|---|---|
| Rubber hydrochloride | 100 |
| Ester plasticizer | 10 |

Both plies are 0.001 inch thick.

The intermediate ply is an extruded film 0.0015 inch thick of the following composition:

| | Percent |
|---|---|
| Polyvinylchloride | 74.0 |
| Ester plasticizer | 24.0 |
| Heat stabilizer | 0.5 |
| Lubricant | 1.5 |

Any of the various heat stabilizers mentioned in the patent literature or elsewhere may be used. The lubricant is of organic composition except for 0.1 percent of talc. Various organic lubricants suitable for this purpose, especially stearic acid, have been mentioned in the patent literature and elsewhere. Pigments, loaders, fillers, etc. many be added to one or more plies as desired.

The plies are oriented and laminated in equipment such as that shown in the accompanying drawings under conditions substantially as there described. The finished three-ply laminate is substantially 0.0004 inch thick. In the drawings—

Figure 1:
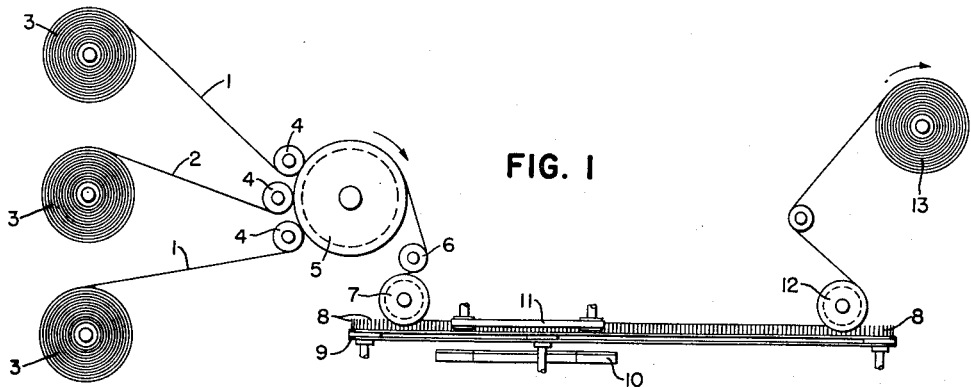
FIG. 1 is a semi-diagrammatic elevation of apparatus for making the laminated product.
Figure 2:
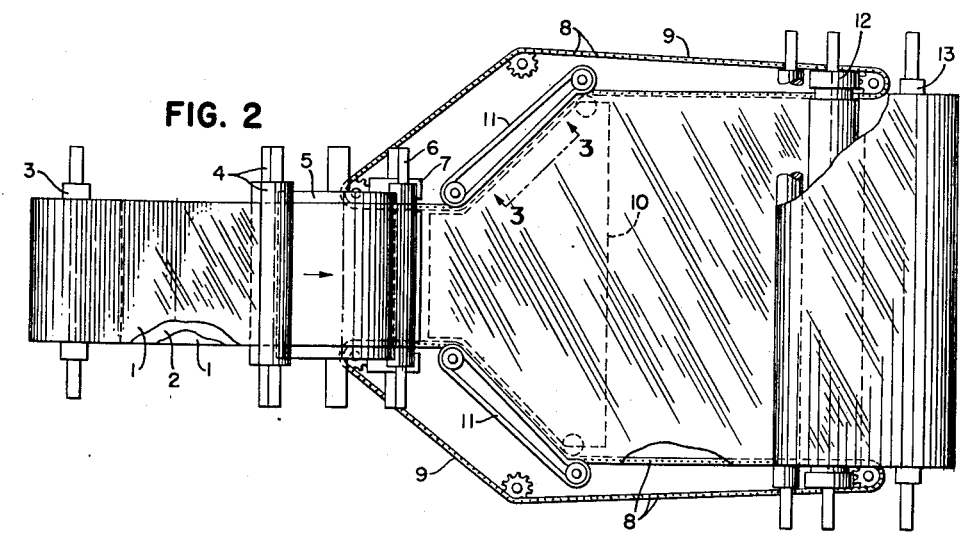
FIG. 2 is a plan view of the apparatus.
Figure 3:
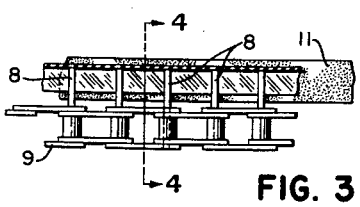
FIG. 3 is a sectional view taken on the line 3—3 in FIG. 2.
Figure 4:
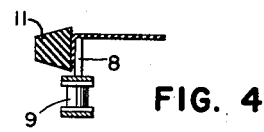
FIG. 4 is a sectional view taken on the line 4—4 of FIG. 3.

Referring to the drawing, two sheets or webs 1 of the unoriented rubber hydrochloride film each 0.001 inch thick and a sheet or web 2 of the unoriented polyvinylchloride film 0.0015 inch thick are fed from supply rolls 3 under pressure or smoothing rolls 4 onto a rotating, heated laminating roll or drum 5 maintained at a temperature of about 230° F., with the vinyl film between the two rubber hydrochloride films. The laminating temperature is determined primarily by the rubber hydrochloride and can be varied from about 220 to 240° F. with slightly lower temperatures being usable with plasticized rubber hydrochloride. If the temperature is too low, bonding of the films will not take place. If the temperature is too high, the rubber hydrochloride will tend to decompose. The several plies are held in snug contact with each other and with the heating roll with sufficient pressure to force out all air from between the plies, and they are thereby heated to a temperature at which they are fused and laminated to each other. The laminated film is then preferably, although not necessarily advanced to a take-off roll 6, which is held at a temperature of about 190° F. and adjusts the temperature of the laminated product prior to stretching it. This temperature may vary from about 170° F. up to 200° F. and is determined primarily by the vinyl film and must be sufficiently high so that it can be stretched readily.

The laminated film is then passed to a longitudinal stretching roll 7, which has a surface speed about three times that of the preceding rolls, so that the three-ply film is stretched to about 300 percent of its original area when it reaches the roll 7. As the longitudinally stretched film leaves the roll 7, its edges are folded over the pins 8 of tentering chains 9. The pins 8 are blunt so as not to tear the sheet or film. The advancing sheet then passes over a heated plate 10, heated to about 300° F. to maintain the sheet at a temperature of substantially 200° F., while the tentering chains diverge thereby stretching the sheet laterally to about three times the original width. Belts 11 hold the edges of the sheet snugly against the pins as the tentering chains diverge. The biaxially stretched sheet is then carried on the pins to a stripping roll 12. The folded edges of the sheet are trimmed off by any of various known devices (not shown) and the sheet goes to a wind-up 13.

The foregoing describes the laminated sheet as being given a balanced biaxial stretching of three times its original dimension in each direction. It can be stretched more or less than this amount. Also, it can be stretched more in one direction than the other, or can be stretched in only one direction. In usual practice, it will be stretched to at least twice the original length in each direction. The preferred treatment is to biaxially stretch to at least three times the original length in each direction.

The resulting sheet is useful for a variety of purposes, such as those to which plastic films are now put, and especially for packaging. It includes a relatively small amount of the more expensive rubber hydrochloride film, while retaining its resistance to moisture, aliphatic hydrocarbons, etc. and heat sealability over a relatively wide temperature range. It can be heated to substantially 140° F. without shrinking (depending upon the temperature at which it is stretched), so is dimensionally stable in storage, and will shrink biaxially when heated above this temperature. Although quite soft and flexible, it has sufficient body to be used on packaging machines and has high tensile strength. It is transparent and is particularly suitable for packaging smoked meats, luncheon meats, frankfurters, etc. By heating, it will shrink tight against the contents of the package, but at normal storage temperatures, including temperatures usually employed for cold storage of meats, etc. it is dimensionally stable.

The invention is protected in the claims which follow. What I claim is:

1. Three-ply film, the surface plies being essentially rubber hydrochloride and the intermediate ply being essentially polyvinylchloride, said film being oriented biaxially to substantially the same extent in both directions to at least four times its original area, the surface plies being the same thickness and composition.

2. Three-ply oriented film substantially 0.0004 inch thick, the surface plies being the same thickness and composed of rubber hydrochloride plasticized with substantially 10 parts of ester plasticizer, and the intermediate ply being composed of substantially 74 parts of polyvinylchloride and 24 parts of ester plasticizer, the balance being essentially heat stabilizer and lubricant; the film being biaxially oriented to substantially nine times its original area.

References Cited in the file of this patent

UNITED STATES PATENTS

| | | |
|---|---|---|
| 2,273,466 | Dinsmore | Feb. 17, 1942 |
| 2,351,350 | Mallory | June 13, 1944 |
| 2,429,177 | Young | Oct. 14, 1947 |
| 2,500,891 | Alexander | Mar. 14, 1950 |
| 2,679,969 | Richter | June 1, 1954 |
| 2,740,741 | Vaughan et al. | Apr. 3, 1956 |

FOREIGN PATENTS

| | | |
|---|---|---|
| 99,349 | Sweden | July 9, 1940 |